US008406251B2

United States Patent
Kent et al.

(10) Patent No.: US 8,406,251 B2
(45) Date of Patent: Mar. 26, 2013

(54) METHOD AND SYSTEM FOR PROCESSING MULTIPATH CLUSTERS

(75) Inventors: Mark Kent, Vista, CA (US); Uri M. Landau, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1032 days.

(21) Appl. No.: 11/173,870

(22) Filed: Jun. 30, 2005

(65) Prior Publication Data

US 2006/0072500 A1   Apr. 6, 2006

Related U.S. Application Data

(60) Provisional application No. 60/616,878, filed on Oct. 6, 2004.

(51) Int. Cl.
  H04W 4/00    (2009.01)
  H04J 3/00    (2006.01)
  H03D 3/18    (2006.01)

(52) U.S. Cl. ........ 370/464; 370/328; 455/101; 455/132; 455/139; 375/347

(58) Field of Classification Search .................. 370/348, 370/320, 328, 329, 335, 342, 436; 375/147, 375/148, 267, 299, 347, 349; 455/65, 436, 455/442, 500, 553.1
See application file for complete search history.

(56) References Cited

U.S. PATENT DOCUMENTS

| | | | | |
|---|---|---|---|---|
| 5,970,053 A * | 10/1999 | Schick et al. | ............... | 370/252 |
| 6,128,276 A | 10/2000 | Agee | | |
| 6,208,632 B1 * | 3/2001 | Kowalski et al. | ........... | 370/335 |
| 6,269,075 B1 * | 7/2001 | Tran | ................................ | 370/206 |
| 6,757,322 B2 * | 6/2004 | Schilling | ......................... | 375/141 |
| 7,010,070 B2 * | 3/2006 | Li et al. | ............................ | 375/349 |
| 7,218,682 B2 * | 5/2007 | Mayor et al. | .................... | 375/299 |
| 7,450,632 B2 * | 11/2008 | Lim | ................................. | 375/148 |
| 2003/0031234 A1 | 2/2003 | Smee et al. | | |
| 2003/0142728 A1 * | 7/2003 | Lin | ................................. | 375/147 |
| 2004/0017843 A1 * | 1/2004 | Fitton et al. | .................... | 375/148 |
| 2005/0243898 A1 | 11/2005 | Reznik et al. | | |
| 2007/0015545 A1 | 1/2007 | Leifer et al. | | |

OTHER PUBLICATIONS

Jan Mietzner and Peter A. Hoeher, University of Kiel, Adaptive Antennas and MIMO Systems for Wireless Communications, Boosting the Performance of Wireless Communication Systems: Theory and Practice of Multiple-Antenna Techniques, IEEE Communications Magazine, Oct. 2004, pp. 40-47.

Simon Haykin, McMaster University; Mathini Sellathurai, Yvo De Jong, and Tricia Willink, Communications Research Centre Canada, Adaptive Antennas and MIMO Systems for Wireless Communications, Turbo-MIMO for Wireless Communications, IEEE Communications Magazine, Oct. 2004, pp. 48-53.

(Continued)

*Primary Examiner* — Wesley Kim

(74) *Attorney, Agent, or Firm* — Sterne, Kessler, Goldstein & Fox P.L.L.C

(57) ABSTRACT

In an RF communication system, aspects for processing multipath clusters may comprise tracking a plurality of received clusters of signals and estimating a phase and amplitude of at least a portion of each of the plurality of received clusters of signals. Each of the plurality of received clusters of signals may be specified in time and an aggregate of received signal paths in a single cluster for a single base station may be processed. At least one cluster path processor may be assigned to process the plurality of received clusters of signals from each transmitting antenna at a single base station. At least one cluster path processor may be assigned to each of a plurality of base stations that are utilized for soft handoff.

36 Claims, 10 Drawing Sheets

OTHER PUBLICATIONS

David J. Love, Purdue University, Robert W. Heath Jr., University of Texas at Austin and Wiroonsak Santipach and Michael L. Honig, Northwestern University; Adaptive Antennas and MIMO Systems for Wireless Communications, What is the Value of Limited Feedback for MIMO Channels?, IEEE Communications Magazine, Oct. 2004, pp. 54-59.

Quentin H. Spencer, Distribution Control Systems, Inc., Christian B. Peel, Swiss Federal Institute of Technology, A. Lee Swindlehurst, Brigham Young University, Martin Haardt, Ilmenau University of Technology, Adaptive Antennas and MIMO Systems for Wireless Communications, An Introduction to the Multi-User MIMO Downlink, IEEE Communications Magazine, Oct. 2004, pp. 60-67.

Shahab Sanayei and Aria Nosratinia, University of Texas at Dallas, Adaptive Antennas and MIMO Systems for Wireless Communications, Antenna Selection in MIMO Systems, IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, Cooperative Communication in Wireless Networks, IEEE Communications Magazine, Oct. 2004, pp. 74-80.

* cited by examiner

METHOD AND SYSTEM FOR PROCESSING MULTIPATH CLUSTERS

CROSS-REFERENCE TO RELATED APPLICATIONS/INCORPORATION BY REFERENCE

This application makes reference, claims priority to, and claims the benefit of U.S. Provisional Application Ser. No. 60/616,878 filed Oct. 6, 2004.

This application is related to the following applications, each of which is incorporated herein by reference in its entirety for all purposes:
U.S. patent application Ser. No. 11/174,303 filed Jun. 30, 2005;
U.S. patent application Ser. No. 11/173,502 filed Jun. 30, 2005;
U.S. patent application Ser. No. 11/173,871 filed Jun. 30, 2005;
U.S. patent application Ser. No. 11/173,964 filed Jun. 30, 2005;
U.S. patent application Ser. No. 11/173,252 filed Jun. 30, 2005;
U.S. patent application Ser. No. 11/174,252 filed Jun. 30, 2005;
U.S. patent application Ser. No. 11/172,756 filed Jun. 30, 2005;
U.S. patent application Ser. No. 11/173,305 filed Jun. 30, 2005;
U.S. patent application Ser. No. 11/172,759 filed Jun. 30, 2005;
U.S. patent application Ser. No. 11/173,689 filed Jun. 30, 2005;
U.S. patent application Ser. No. 11/173,304 filed Jun. 30, 2005;
U.S. patent application Ser. No. 11/173,129 filed Jun. 30, 2005;
U.S. patent application Ser. No. 11/172,779 filed Jun. 30, 2005;
U.S. patent application Ser. No. 11/172,702 filed Jun. 30, 2005;
U.S. patent application Ser. No. 11/173,727 filed Jun. 30, 2005;
U.S. patent application Ser. No. 11/173,726 filed Jun. 30, 2005;
U.S. patent application Ser. No. 11/172,781 filed Jun. 30, 2005;
U.S. patent application Ser. No. 11/174,067 filed Jun. 30, 2005;
U.S. patent application Ser. No. 11/173,854 filed Jun. 30, 2005;
U.S. patent application Ser. No. 11/173,911 filed Jun. 30, 2005; and
U.S. patent application Ser. No. 11/174,403 filed Jun. 30, 2005.

FIELD OF THE INVENTION

Certain embodiments of the invention relate to communication receivers. More specifically, certain embodiments of the invention relate to a method and system for processing multipath clusters.

BACKGROUND OF THE INVENTION

The standard for Cellular Mobile Communication Network and various technologies outlined in this invention are provided by The Third Generation Partnership Project (3GPP) consortium.

FIG. 1a is a technology timeline indicating evolution of existing WCDMA specification to provide increased downlink throughput. Referring to FIG. 1a, there is shown various wireless technologies including General Packet Radio Service (GPRS) 100, Enhanced Data rates for GSM (Global System for Mobile communications) Evolution (EDGE) 102, the Universal Mobile Telecommunications System (UMTS) 104, and the High Speed Downlink Packet Access (HSDPA) 106.

The GPRS 100 and the EDGE 102 are two technologies utilized for enhancing the data throughput of present second generation (2G) system, for example, the GSM. The GSM technology supports data rates of up to 14.4 kilobits per second (Kbps), while the GPRS technology 100 introduced in 2001 supports data rates of up to 115 Kbps by allowing up to 8 time slots for data per time division multiplex access (TDMA) frame. The GSM technology, by contrast, allows only 1 time slot for data per TDMA frame. The EDGE technology 102, introduced in 2003, supports data rates of up to 384 Kbps. The EDGE technology 102 utilizes 8 phase shift keying (8-PSK) modulation for greater data rates than the GPRS technology 100. The GPRS 100 and EDGE 102 may be referred to as "2.5G" technologies.

The UMTS technology 104, introduced in 2003 with theoretical data rates as high as 2 megabits per second (Mbps), is an adaptation of the wideband code division multiple access (WCDMA) 3G system by GSM. One reason for the high data rates of the UMTS technology 104 stems from the WCDMA channel bandwidths of 5 MHz versus the 200 KHz channel bandwidths for GSM. The HSDPA technology 106 is an Internet protocol (IP) based service oriented for data communications, which adapts WCDMA to support data transfer rates of the order of 10 Mbps. The HSDPA technology 106 achieves higher data rates through a plurality of methods. For example, many transmission decisions may be made at the base station level, which is much closer to the user equipment as opposed to being made at a mobile switching center or office. These may include decisions about the scheduling of data to be transmitted, when data are to be retransmitted, and assessments about the quality of the transmission channel. The HSDPA technology 106 may also utilize variable coding rates in transmitted data. The HSDPA technology 106 also supports 16-level quadrature amplitude modulation (16-QAM) over a high-speed downlink shared channel (HS-DSCH), which permits a plurality of users to share an air interface channel.

A WCDMA base transceiver station (BTS) may transmit a signal that may be reflected and/or attenuated by various obstacles and surrounding objects while propagating through the media. As a result, various copies of the transmitted signal, at various power levels, may be received at the mobile terminal with various time offsets introduced. The plurality of signals received by the mobile terminal may be referred to as multipath signals (multipaths). The propagation media may be referred to as the RF channel. Considerable effort is typically invested in recovering the received signal from distortion, interference and noise that may have been introduced while the received signal propagated through the RF channel. The RF channel may be characterized by its RF bandwidth and whether it consists of a single signal path (path), referred to as flat fading channel, or multipath signals, referred to as selective fading channel.

Mathematically, the effect on the signal at the mobile terminal antenna, at a time, may be expressed as a complex weight that denotes gain and RF phase. The weight may vary in time as the mobile terminal user moves from one location to another. Furthermore, the path energy, which may be determined by taking the absolute value of the square of the weight, may increase or decrease in a relatively short period of time. Since the received signal may be a superposition of the multiple signals from all paths, the impact of the RF channel may be characterized as a time-variant channel where the aggregate of the weights, which may be time variant channel impulse responses, may be known by their statistical properties. To recover the transmitted information from the received signal that may have been affected by the RF channel, a rake receiver is typically used.

A rake receiver may determine an estimate for each of the detected paths by correlating, or descrambling, the input signal with a Gold code (GC) that may be timely synchronized with a detected path. Thus the rake receiver may be equipped with a bank of correlators where each correlator may timely track the time position of a detected path. The rake receiver may weight a path by a complex conjugate of the path estimate. The individual path estimates may be timely compensated for their delay and combined. The combining operation, which may be a summation of the weighted signals, is known in the art as maximum ratio combining (MRC).

Within the context of a rake receiver terminology, a finger may be the apparatus that may be assigned to a detected path, tracks it timely, produces the path estimate and weights the path estimate by the conjugate of the path estimate. A plurality of fingers may be assigned to track and demodulate a plurality of multipath signals. The output of the fingers may then be combined and further demodulated and decoded.

A considerable part of receiver design may involve managing the rake receiver fingers. A functional block in the rake receiver known as a "searcher" may locate new multipath signals and subsequently allocate a finger to each new multipath signal. The searcher may detect a signal path based on the amount of energy contained in a signal, identify that signal path if it carries user's data, and subsequently monitor the detected signal path. Once the detected signal energy in a path is above a given threshold, a finger in the rake receiver may be assigned to the path and the signal energy level may be constantly monitored.

However, partitioning a received signal into several fingers, each of which may process and exploit energy in a single path, may have limitations. For example, multipath signals may rarely be characterized by distinct, discrete times of arrival. As a result, the rake receiver may be inefficient at exploiting the power in the received signals. In addition, managing the fingers-may incur high processing overhead. The total amount of time required to identify a path, assign a finger, and exploit the signal energy may account for 20-30% of the life span of a path.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for processing multipath clusters, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for processing multipath clusters. Aspects of the method may comprise tracking a plurality of received clusters of signals that may be transmitted via at least one antenna per base station, and may be processed by a plurality of cluster path processors. Embodiments of the invention may utilize at least one cluster path processor (CPP) that may generate a RF channel estimate to recover the original signal transmitted. U.S. application Ser. No. 11/173,854 provides a detailed description of the CPP and is hereby incorporated herein by reference in its entirety. A single cluster path processor may be assigned to process a single cluster of signals. A RF channel estimate may be generated for at least a portion of each of the plurality of received clusters of signals. A single cluster of the plurality of received clusters of signals may comprise an aggregate of received signal paths. The RF channel estimate may be processed with at least a portion of each of the plurality of received clusters of signals. Additionally, a timing signal may be generated to reference the RF channel estimate. This CPP may facilitate novel and efficient methods for implementing processes such as assigning, tracking, measuring and reporting information (for example, energy and temporal location) based on statistical means as observed across a received signal cluster. This may eliminate the need for applying the same tasks, as may be performed by a rake receiver, on each of the received individual distinct path signals contained in the signal cluster.

Figure 1A:
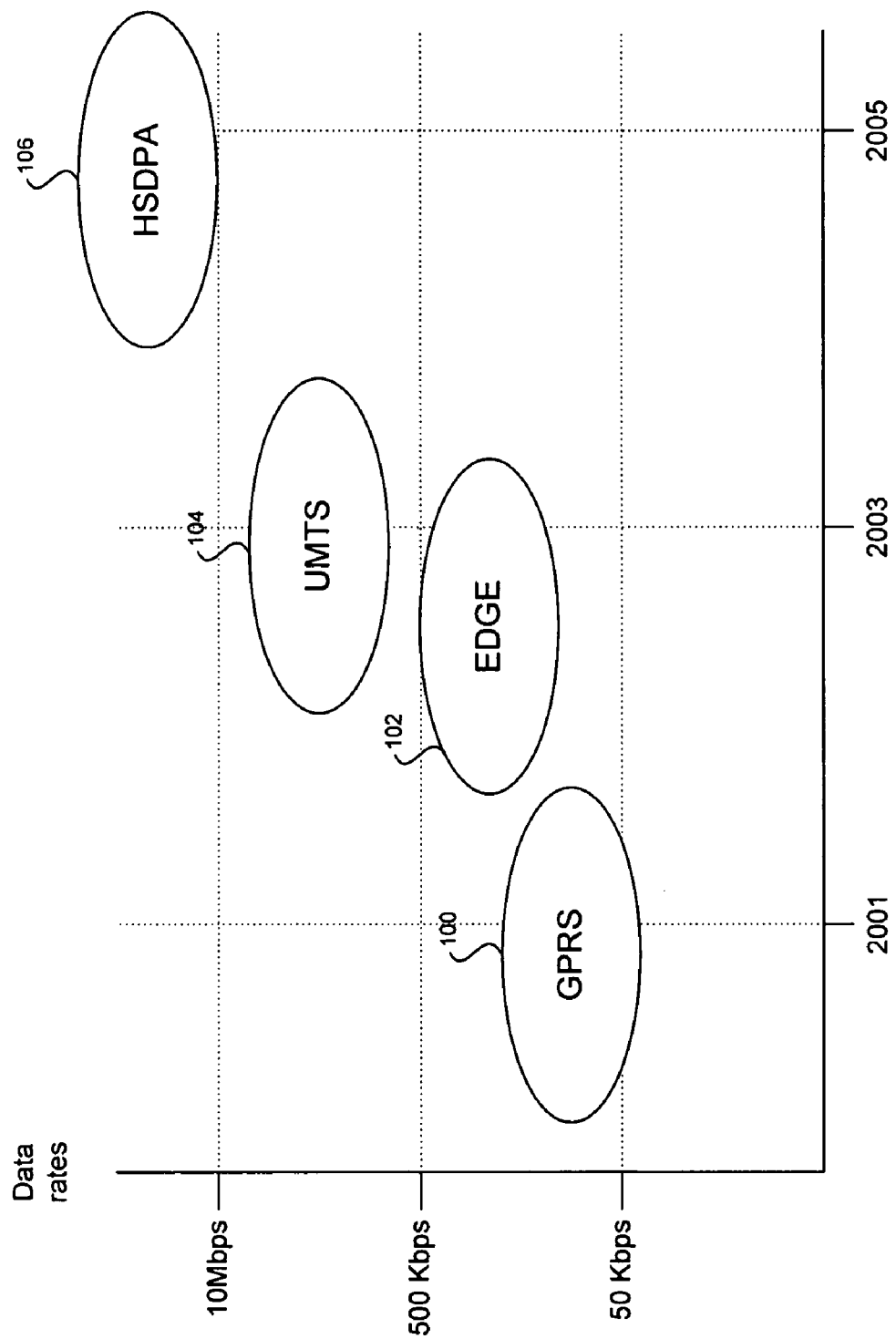
FIG. 1a is a technology timeline indicating evolution of existing WCDMA specification to provide increased downlink throughput.
Figure 1B:
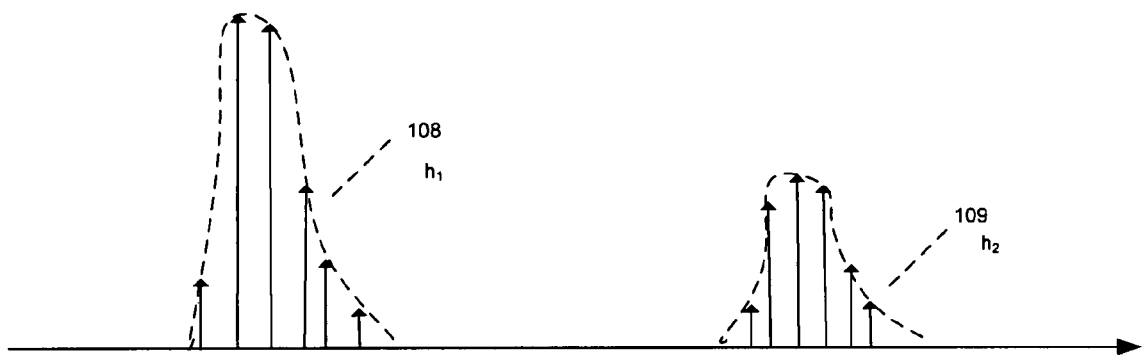
FIG. 1b is an exemplary timing diagram of signal clusters, in accordance with an embodiment of the invention.

However, there are cases where the mobile may receive signals from several remote sources. It, therefore, may necessitate a system and a method that combines signals from a plurality of CPPs, and each CPP may track a unique multipath. FIG. 1b is a timing diagram of exemplary signal clusters, in accordance with an embodiment of the invention. Referring to FIG. 1b, there is shown exemplary received power paths that are timely grouped into two clusters of signals 108 and 109. Such a scenario may occur either when the mobile terminal receives signals from two base-stations or when signals reflect from remote reflectors to the mobile terminal. A CPP may be assigned to each of the clusters of signals 108 and 109. The CPPs may temporally track the clusters of signals 108 and 109 and produce timing signals corresponding to the clusters of signals 108 and 109. A mobile terminal's capability to receive signals from a plurality of clusters of signals and combine their energies may enhance the mobile terminal's performance and maintain a quality of service and standard of operation requirements. A plurality of clusters of signals may be received by the mobile terminal, for example, in instances where two or more base stations may be transmitting to the mobile terminal, or signals transmitted by the base stations may be reflected by several reflectors located at different distances from the mobile terminal.

In-phase and quadrature components for the plurality of received clusters of signals may be processed, and the processing may comprise convolving the RF channel estimate with at least a portion of each of the plurality of received clusters of signals to generate convolved signals. The convolved signals may be despread to generate despread signals. A plurality of despread signals may be coherently combined to generate combined signals. A timing signal may be generated to reference the combined signals.

Figure 1C:
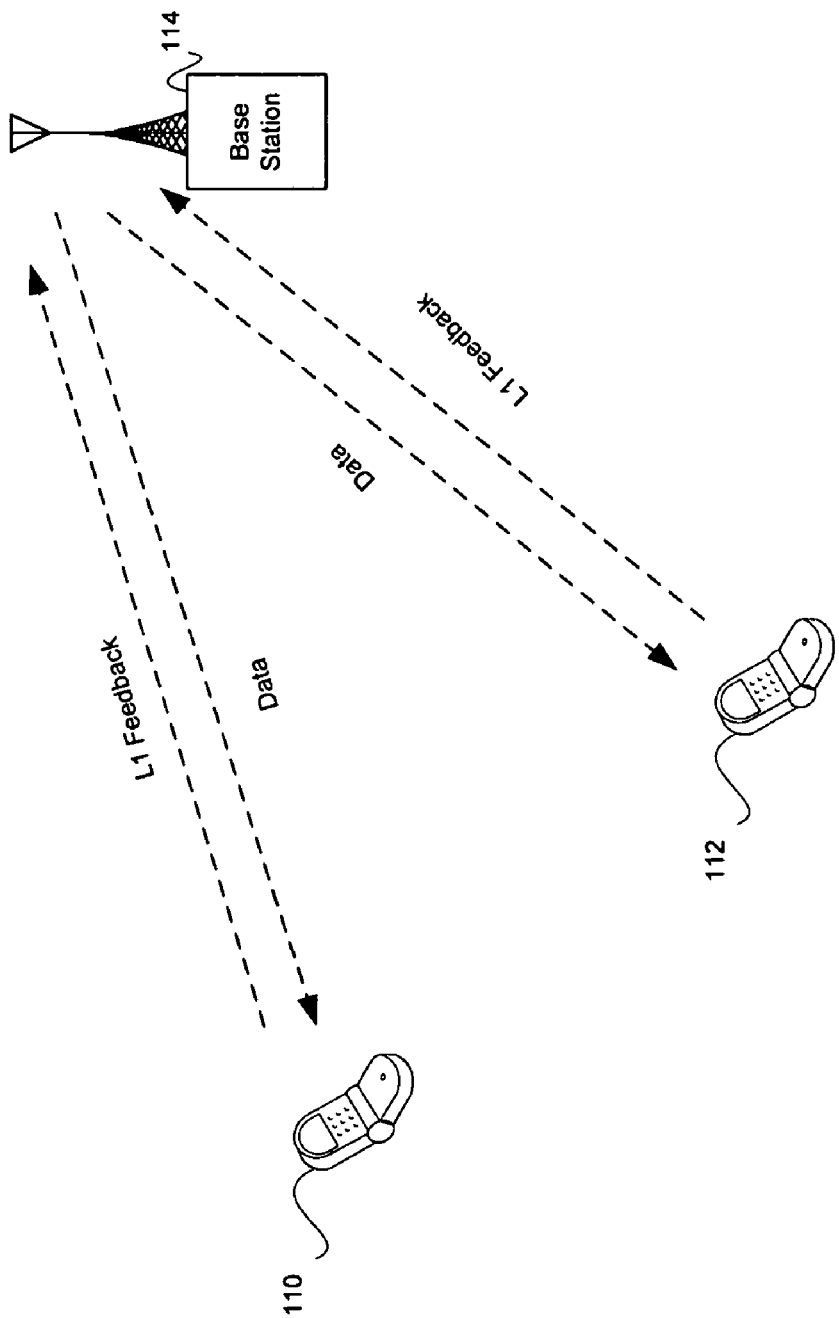
FIG. 1c illustrates an exemplary High Speed Downlink Packet Access (HSDPA) distributed architecture that achieves low delay link adaptation, in connection with an embodiment of the invention.

FIG. 1c illustrates an exemplary HSDPA distributed architecture that achieves low delay link adaptation, in connection with an embodiment of the invention. Referring to FIG. 1c, there is shown terminals 110 and 112 and a base station (BS) 114. HSDPA is built on a distributed architecture that achieves low delay link adaptation by placing key processing at the BS 114, which may be a medium access control (MAC), closer to the physical layer (PHY) air interface as illustrated. HSDPA leverages methods that are well established within existing GSM/EDGE standards, including fast physical layer (L1) retransmission combining and link adaptation techniques, to deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control may not reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1D:
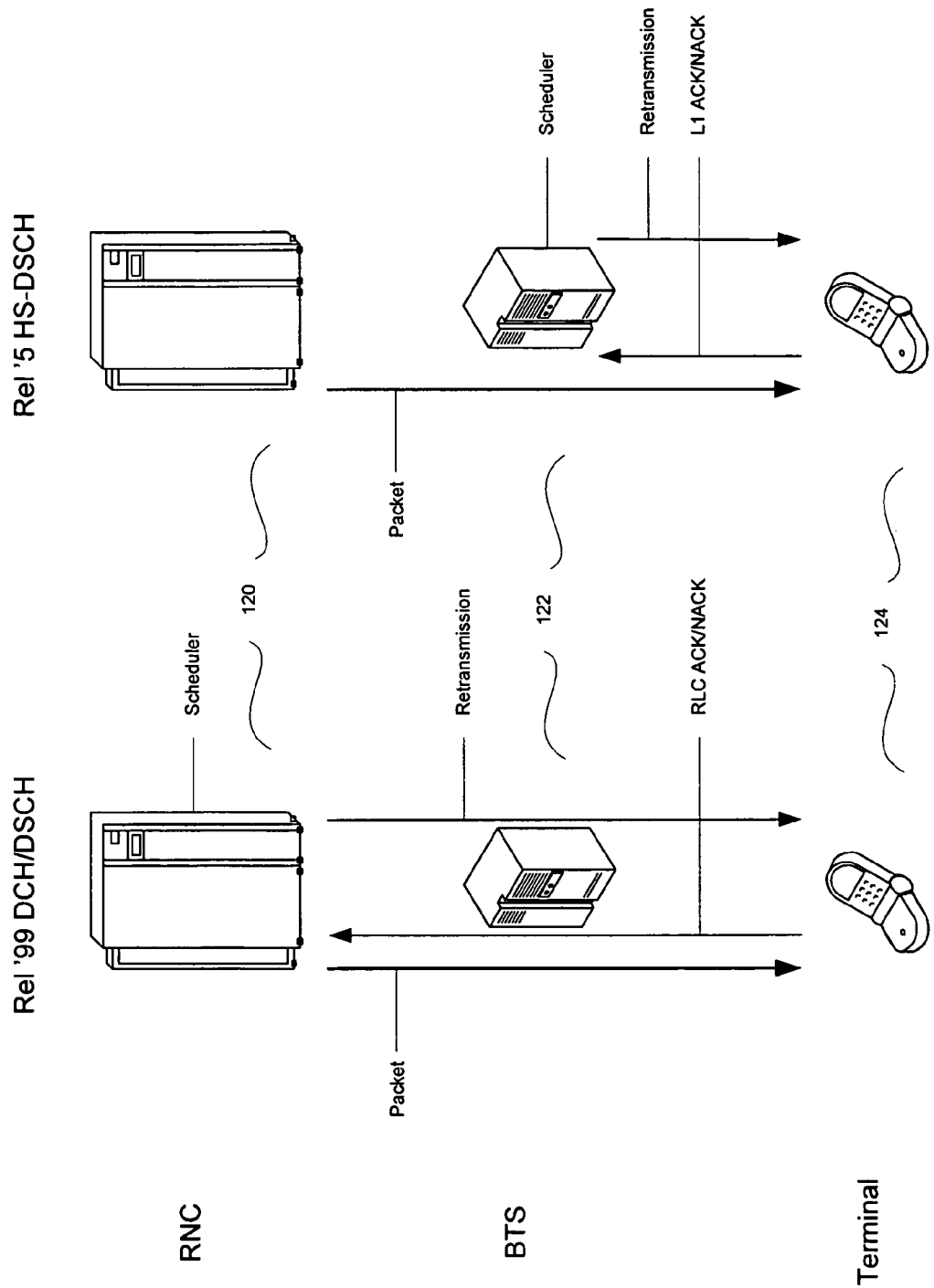
FIG. 1d illustrates an exemplary Layer 1 HARQ control situated in a base station to remove retransmission-related scheduling and storing from the radio network controller, in connection with an embodiment of the invention.

FIG. 1d illustrates an exemplary Layer 1 HARQ control situated in a base station to remove retransmission-related scheduling and storing from the radio network controller, in connection with an embodiment of the invention. Referring to FIG. 1d, there is shown a hybrid automatic repeat request (HARQ) operation, which is an operation designed to reduce the delay and increase the efficiency of retransmissions. Layer 1 HARQ control is situated in the Node B, or base station (BS) 122, thus removing retransmission-related scheduling and storing from the radio network controller (RNC) 120. This HARQ approach avoids hub delay and measurably reduces the resulting retransmission delay.

For example, when a link error occurs, due to signal interference or other causes, a mobile terminal 124 may request the retransmission of the data packets. While current-generation WCDMA networks handle those retransmission requests through the radio network controller 120, HSDPA retransmission requests are managed at the base station 122. Using this approach, packets are combined at the physical (PHY) layer and the mobile terminal 124 stores the received data packets in soft memory. If decoding has failed, the new transmission is combined with the old transmission before channel decoding. The HSDPA approach allows previously transmitted bits from the original transmission to be combined with the retransmission. This combining strategy provides improved decoding efficiencies and diversity gains while minimizing the need for additional repeat requests.

While the spreading factor may be fixed, the coding rate may vary between ¼ and ¾, and the HSDPA specification supports the use of five, 10 or 15 multicodes. More robust coding, fast HARQ, and multi-code operation eliminates the need for variable spreading factor and also allows for more advanced receiver structures in the mobile terminal 124 such as equalizers as apposed to the traditional RAKE receiver used in most CDMA systems. This approach may also allow users having good signal quality or higher coding rates and those at the more distant edge of the cell having lower coding rates to each receive an optimum available data rate.

By moving data traffic scheduling to the base station 122, and thus closer to the air interface, and by using information about channel quality, terminal capabilities, QoS, and power/code availability, HSDPA may achieve more efficient scheduling of data packet transmissions. Moving these intelligent network operations to the base station 122 allows the system to take full advantage of short-term variations, and thus to speed and simplify the critical transmission scheduling process. The HSDPA approach may, for example, manage scheduling to track the fast fading of the users and when conditions are favorable to allocate most of the cell capacity to a single user for a very short period of time. At the base station 122, HSDPA gathers and utilizes estimates of the channel quality of each active user. This feedback provides current information on a wide range of channel physical layer conditions, including power control, ACK/NACK ratio, QoS, and HSDPA-specific user feedback.

While WCDMA Release 99 or WCDMA Release 4 may support a downlink channel (DCH) or a downlink shared channel (DSCH), the HSDPA operation provided by WCDMA Release 5 may be carried on a high-speed downlink shared channel (HS-DSCH). This higher-speed approach uses a 2-ms frame length, compared to DSCH frame lengths of 10, 20, 40 or 80 ms. DSCH utilizes a variable spreading factor of 4 to 256 chips while HS-DSCH may utilize a fixed spreading factor of 16 with a maximum of 15 codes. HS-DSCH may supports 16-level quadrature amplitude modulation (16-QAM), link adaptation, and the combining of retransmissions at the physical layer with HARQ. HSDPA also leverages a high-speed shared control channel (HS-SCCH) to carry the required modulation and retransmission information. An uplink high-speed dedicated physical control channel (HS-DPCCH) carries ARQ acknowledgements, downlink quality feedback and other necessary control information on the uplink.

Figure 1E:
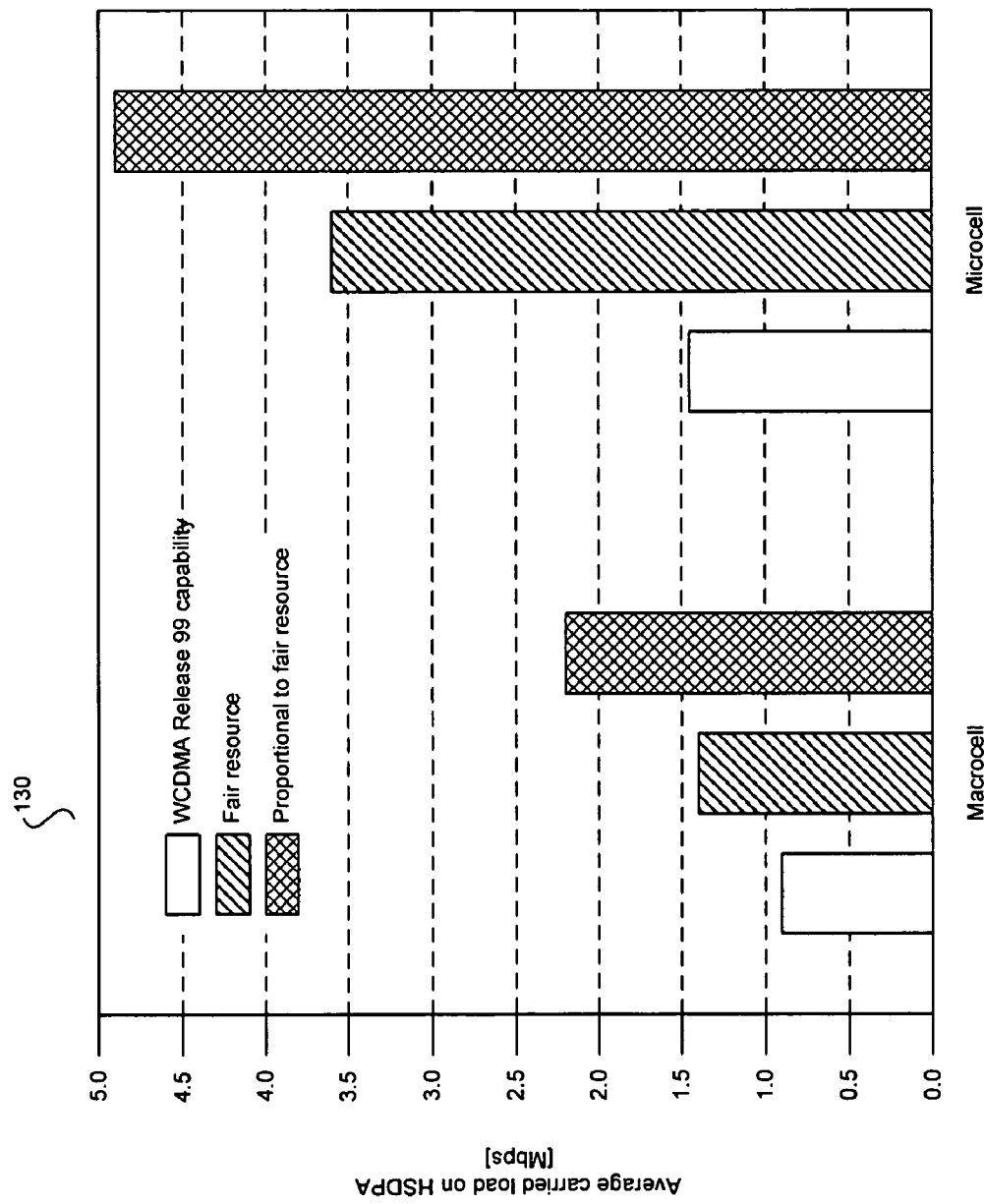
FIG. 1e is a chart illustrating exemplary average carried loads for HSDPA-based macrocell and microcell systems, in connection with an embodiment of the invention.

FIG. 1e is a chart illustrating exemplary average carried loads for HSDPA-based macrocell and microcell systems, in connection with an embodiment of the invention. Referring to the chart 130 in FIG. 1e, in practical deployments, HSDPA more than doubles the achievable peak user bit rates compared to WCDMA Release 99. With bit rates that are comparable to DSL modem rates, HS-DSCH may deliver user bit rates in large macrocell environments exceeding 1 Mbit/s, and rates in small microcells up to 5 Mbit/s. The HSDPA approach supports both non-real-time UMTS QoS classes and real-time UMTS QoS classes with guaranteed bit rates.

Cell throughput, defined as the total number of bits per second transmitted to users through a single cell, increases 100% with HSDPA when compared to the WCDMA Release 99. This is because HSDPA's use of HARQ combines packet retransmission with the earlier transmission, and thus no transmissions are wasted. Higher order modulation schemes, such as 16-QAM, enable higher bit rates than QPSK-only modulation in WCDMA Release 99, even when the same orthogonal codes are used in both systems. The highest throughput may be obtained with low inter-path interference and low inter-cell interference conditions. In microcell designs, for example, the HS-DSCH may support up to 5 Mbit/s per sector per carrier, or 1 bit/s/Hz/cell.

Modeling the received multipath signals as a plurality of closely positioned paths may depict a more accurate physical picture than modeling them as distinct paths that may be independent of each other. These aggregated multipath signals may be spread over a period of time referred to as a delay spread. Although an embodiment of the invention described may comprise combining the output of two CPPs, the invention need not be so limited. Accordingly, other embodiments of the invention may use a different number of CPPs.

While the CPP may track the temporal positions of the aggregate of received signal paths and energies associated with the paths, it may be desirable for the mobile terminal to have the capability to receive signals from a plurality of clusters of paths and combine their energies. This may enhance the mobile terminal's performance for maintaining quality of service (QoS) and standard operation requirements when, for example, the mobile terminal may receive signals from two or more base stations, or several reflectors, that may be located at different distances from the mobile terminal.

Figure 2A:
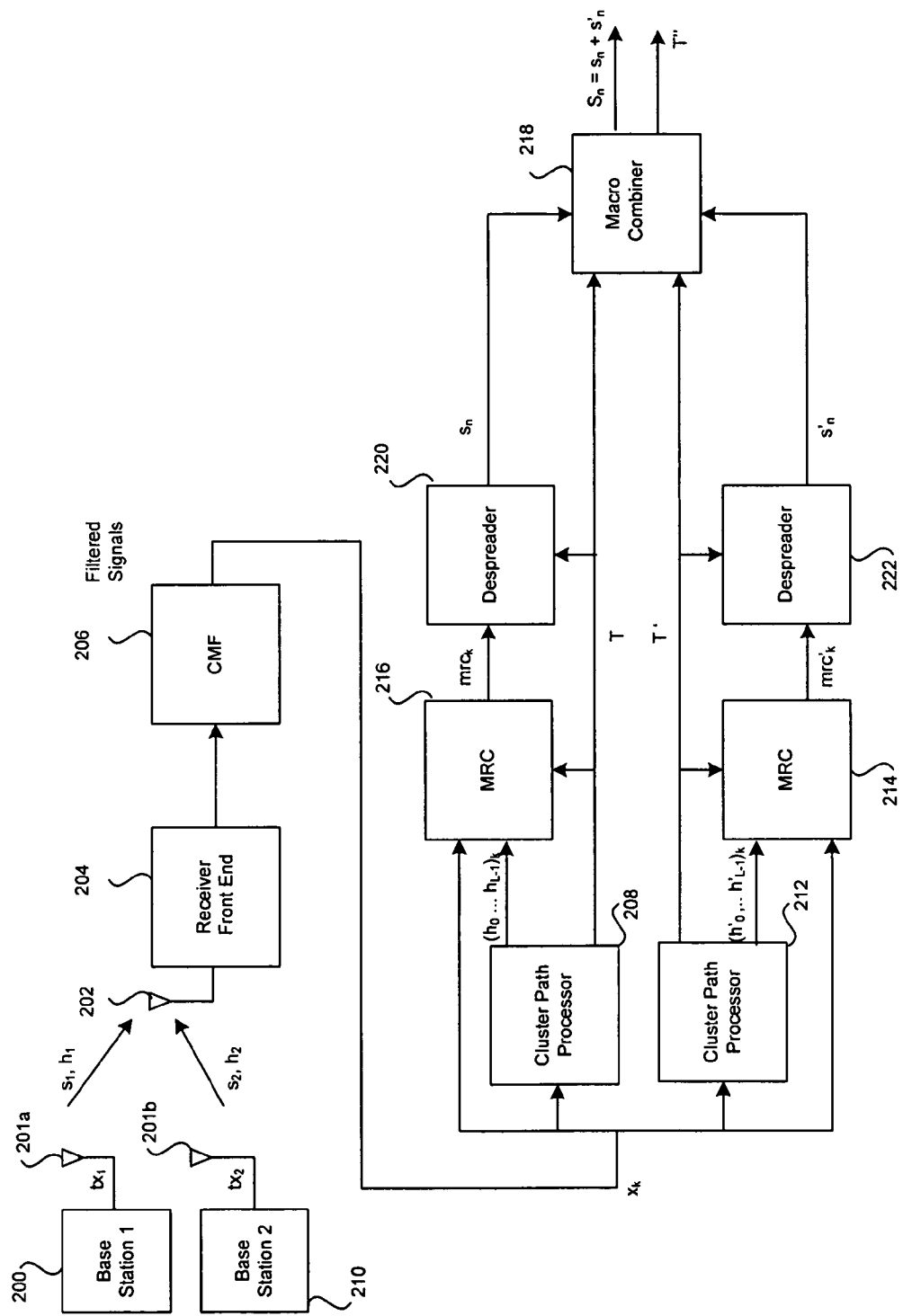
FIG. 2a is a block diagram illustrating exemplary receiver front end with two cluster path processors, two despreaders, and a macro combiner, in accordance with an embodiment of the invention.

FIG. 2a is a block diagram illustrating exemplary receiver front end with two cluster path processors, two despreaders, and a macro combiner, in accordance with an embodiment of the invention. Referring to FIG. 2a, there is shown base stations 200 and 210, transmit antennas 201a and 201b, a receive antenna 202, a receiver front end (RFE) block 204, a chip matched filter (CMF) block 206, cluster path processors (CPP) 208 and 212, MRCs 216 and 214, despreaders 220 and 222, and a macro combiner block 218.

The base stations 200 and 210 may transmit RF signals, for example, so and S2, via transmit antennas 201a and 201b, respectively. The RF signals si and S2 may be the same data, such as, for example, during a soft-handoff. The RF signals si and S2 may be transmitted over RF channels whose time variant channel impulse responses may be represented by the vectors $h_1$ and $h_2$, respectively. The RF signals $s_1$ and $s_2$ may contain the same data, however, the RF signals may comprise different control channels and other user signals.

The receive antenna 202 may comprise suitable logic, circuitry and/or code that may be adapted to receive RF signals, for example, the RF signals s1 and s2. The signals received may be an aggregate of signal paths. The RFE 204 may comprise suitable logic, circuitry and/or code that may be adapted to receive RF signals as input and convert the RF signals to baseband signal. The baseband signal may be sampled digitally at a determined rate, and the resulting digital baseband signal may be an output of the RFE block 204. The CMF block 206 may comprise suitable logic, circuitry and code that may be adapted to digitally filter the digital baseband signal. A plurality of digital filters may provide a combined response that may be equivalent to two filters of type Square Root Raised Cosine. The CMF block 206 may digitally filter the digital baseband signals to produce in-phase and quadrature components, as required by the WCDMA Standard.

The CPP 208 may produce a RF channel estimate $\{\hat{h}_0, \ldots, \hat{h}_{L-1}\}_k$ for the signal transmitted by antenna 201a. The MRC 216 may convolve the received signal $x_k$ that may be from the CMF 206 with the RF channel estimate $\{\hat{h}_0, \ldots, \hat{h}_{L-1}\}_k$ to generate output $mrc_k$. For each time index k, the $mrc_k$ may comprise two values that may correspond to the in-phase and quadrature components. Similarly, the CPP 212 and the MRC 214 may produce the RF channel estimate $\{\hat{h}'_0, \ldots, \hat{h}'_{L-1}\}_k$ for the signal transmitted by antenna 201b. The MRC 214 may convolve the received signal $x_k$ that may be from the CMF 206 with the RF channel estimate $\{\hat{h}'_0, \ldots, \hat{h}'_{L-1}\}_k$ to generate output $mrc_k$. For each time index k the $mrc_k$ may comprise two values that may correspond to the in-phase and quadrature components. The CPPs 208 and 212 may also generate timing signals T and T', respectively. These timing signals may indicate the time index k to the MRCs 214 and 216, the despreaders 220 and 222, and to the macro combiner 218.

The signals $mrc_k$ and $mrc'_k$ may be processed by the despreaders 220 and 222, respectively, to produce the outputs $s_n$ and $s'_n$, respectively. The despreaders 220 and 222 may be adapted to generate local codes, for example Gold codes and/or orthogonal variable spreading factor (OVSF) codes, that may be applied to received signals through a method that may comprise multiplication and accumulation operations. Processing gain may be realized after completion of integration over a pre-determined number of chips in which the symbol is modulated. The outputs $s_n$ and $s'_n$ may be referred to as symbols. The index n may identify the values of $s_n$ and $s'_n$ that may represent the same data value and therefore the two values may have to be combined. The index n may be the count of the symbols from a slot clock, where the slot clock may be defined in the WCDMA standard. It may be defined as a clock that divide the WCDMA frame into 15 sub frames referred to as slot number 0 to 14.

The symbols $s_n$ and $s'_n$ may be valid at two different time instants, for example, $t_n$ and $t'_n$. This may be due to different propagation paths that may be associated with the symbols $s'_n$ and $s_n$. The difference, which may be described by:

$$e = |t_n - t'_n|$$

may be as large as, for example, 148 chip-times. The chip-time is defined in the WCDMA standard as $T_{chip}=1/(3.84\times 10^6)$ seconds. The duration of 148 chips may be the maximum allowed time between signals from two base stations according to the WCDMA standard. The 148 chips of time allowed between two base stations may correspond to a distance given the propagation speed of the transmitted signals. The macro combiner block 218 may combine the outputs $s_n$ and $s'_n$ from the despreaders 220 and 222, respectively, to generate the output $S_n$. Accordingly, the output $S_n$ may be the combined signals from two different base stations, for example, the base stations 200 and 210.

Although two CPPs, two MRCs and two despreaders may have been described with respect to this figure, the invention need not be so limited. For example, there may be multiple base-stations involved during a soft-handoff. Additionally, there may be multiple transmit antennas for each base station. Accordingly, there may be a CPP, an MRC and a despreader assigned to each transmit antenna at each base station.

Figure 2B:
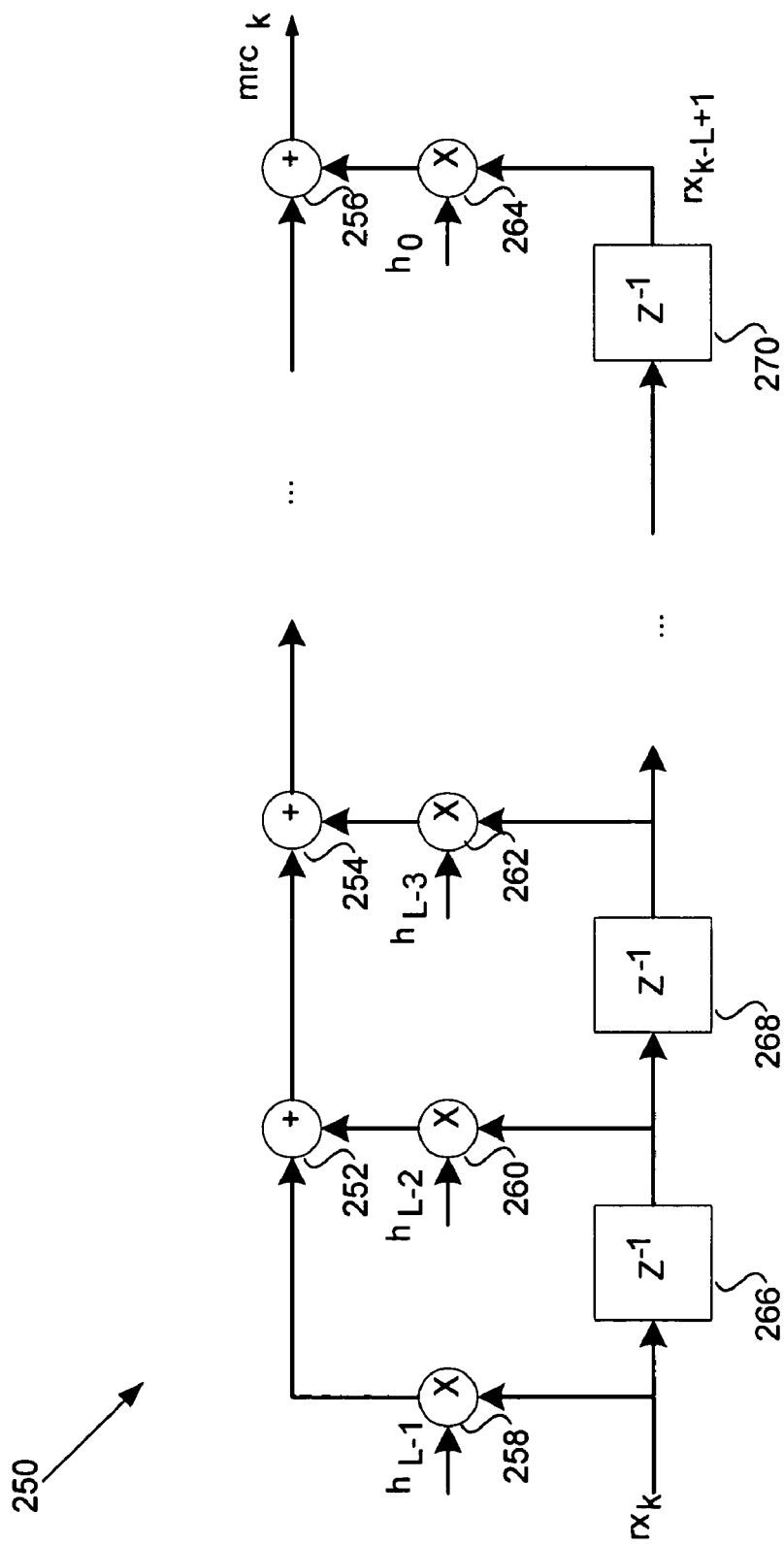
FIG. 2b is a block diagram illustrating exemplary maximum-ratio combining, in accordance with an embodiment of the invention.

FIG. 2b is a block diagram illustrating exemplary maximum-ratio combining block, in accordance with an embodiment of the invention. Referring to FIG. 2b, the maximum-ratio combining (MRC) block 250 may comprise a plurality of adders 252, . . . , 256, a plurality of multipliers 258, . . . , 264, and a plurality of delay blocks 266, . . . , 270. In one embodiment of the invention, the MRC block 250 may receive a plurality of path estimates $h_{ik}$ (i=0,1, . . . , L-1) from a corresponding cluster path processor block. For example, the MRC blocks 216, 214 (FIG. 2a) may receive estimate vectors $\hat{h}_1$ and $\hat{h}_2$, respectively, of the actual time varying impulse response of a channel, from the cluster path processors 208, 212 (FIG. 2a). Each of the estimate vectors $\hat{h}_1$ and $\hat{h}_2$ may comprise a cluster of paths with estimates $\hat{h}_{i,k}$(i=0,1, . . . , L-1), where k is a chip time index and L may indicate the width of the cluster and may be related to the delay spread of the channel.

In operation, the MRC block 250 may be adapted to implement the following equation:

$$mrc_k = \sum_{i=0}^{L-1} h_{L-1-i} \cdot rx_{k-i},$$

where $mrc_k$ is the output of the MRC block 250, $h_i$; I=0,L-1 is the plurality of channel estimates corresponding to a channel estimate vector, such as $\hat{h}_1$ and $\hat{h}_2$, and $rx_k$ is a filtered complex input signal. The MRC block 250 may be adapted to add individual distinct path signals together in such a manner to achieve a high signal to noise ratio (SNR) in an output signal $mrc_k$.

The MRC block 250 may receive a filtered complex signal $rx_k$ from a chip matched filter (CMF), for example. The filtered complex signal $rx_k$ may comprise in-phase (I) and quadrature (Q) components of a received signal. Furthermore, the filtered complex signal $rx_k$ may be gated by cluster path processor (CPP) output strobes derived from a CPP timing signal, for example, the timing signal T or T' (FIG. 2a). Channel estimates $h_{ik}$ (i=0,1, . . . , L-1) may be applied to the CMF output $rx_k$ beginning with the last in time, $h_{L-1}$, and proceeding with channel estimates $h_{L-2}$, . . . , $h_0$, utilizing multiplier blocks 258, . . . , 264, respectively. The filtered complex input signal $rx_k$ may be continuously delayed by delay blocks 266, . . . , 270. Each delayed output of the delay blocks 266, . . . , 270 may be multiplied by the multiplier blocks 260, . . . , 264, respectively, utilizing corresponding channel estimates $hi_k$. The outputs of the multipliers 252, . . . , 256 may be added to generate the output signal $mrc_k$, thereby implementing the above-referenced MRC equation.

Figure 3:
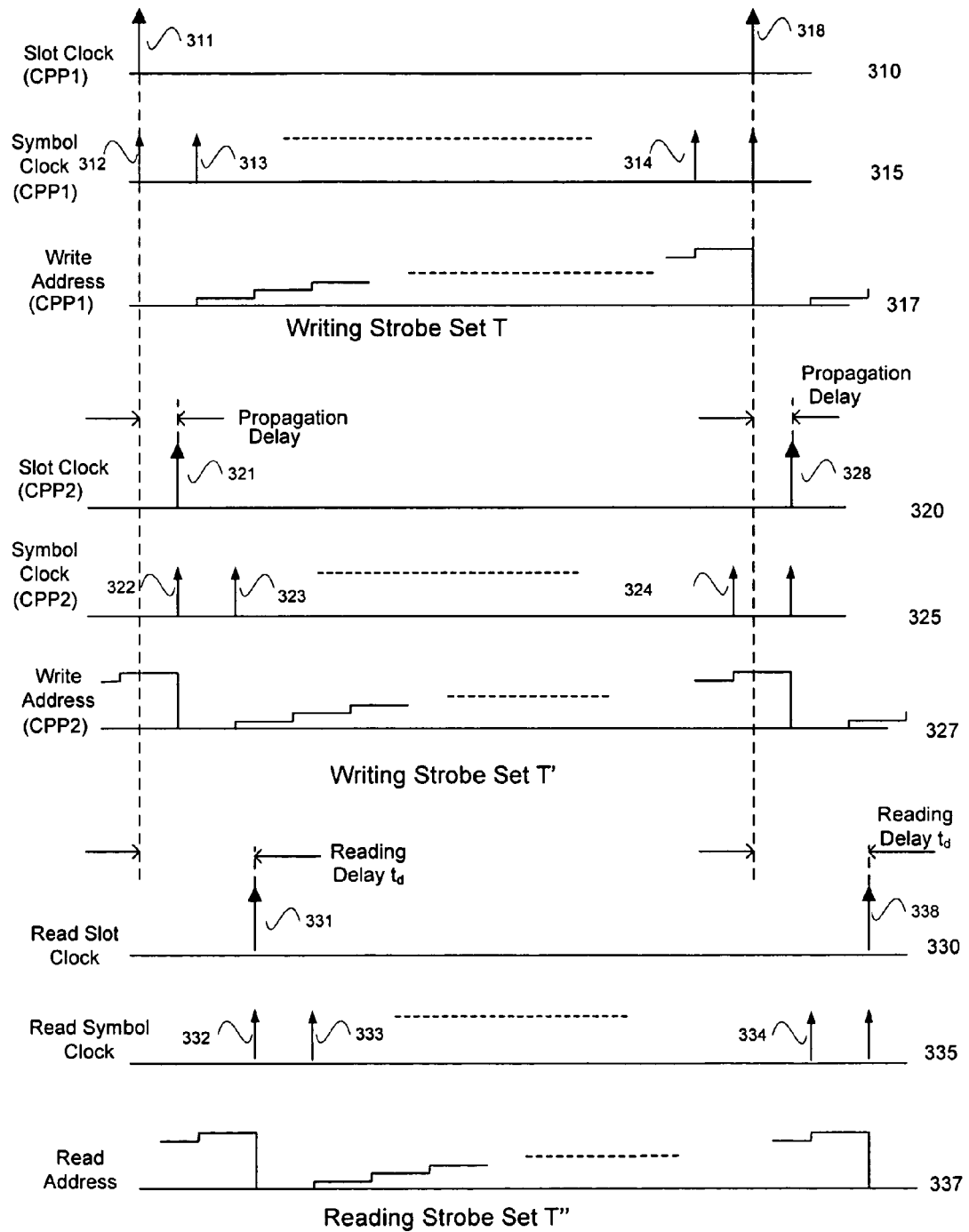
FIG. 3 is exemplary timing diagrams that illustrate the time strobes associated with two CPPs and their relations to the read-strobes.

FIG. 3 is exemplary timing diagrams that illustrate the time strobes associated with two CPPs and their relations to the read-strobes. Referring to FIG. 3, there is shown slot clocks 310, 320, and 330, symbol clocks 315, 325, and 335, and write addresses 317, 327, and 337. The slot clock 310 and the symbol clock 315 may be received from the CPP 208 (FIG. 2a) and the slot clock 320 and the symbol clock 325 may be received from the CPP 212 (FIG. 2a). The write addresses 317 and 327, and the read address 337 may be generated by the macro combiner block 218 (FIG. 2a). The read address 337 may be based on the delayed slot clock 330 and the delayed symbol clock 335.

The WCDMA standard may specify that a standard slot rate is 1500 Hz. Given the chip period of $1/(3.84\times10^6)$ seconds, this may be equivalent to 2560 chips. The number of symbols in a slot may be a factor of the number 2560. For example, there may be 640 symbols in a slot if a period of a symbol is four chips. This may be the fastest symbol rate in WCDMA. Similarly, for a symbol with a period of 512 chips, the number of symbols in the slot may be five. Within the context of this invention the terms clock, timing-signal are strobe are interchangeable and have the same meaning, namely marking a time event, for example, that a signal value is valid and/or has been updated. The terms may also signify partitioning of the time axis into duration periods. The term data and signal are used interchangeably and may imply a numeric value, for example, that may be measured and/or is a result of computation.

The start of a slot period may be indicated by a slot clock, for example, the slot clock 310. The starting times of two slots is shown, for example, at time instances 311 and 318. Within a slot, a symbol clock, for example, the symbol clock 315, may indicate appropriate times for symbols. For example, the time instances 312, 313, . . . , 314 may indicate appropriate times for symbols in the slot that may start at time instant 311. The period of each symbol may be one symbol clock in duration, for example, from the time instance 312 to the time instance 313. The data associated with each symbol may be stored in a buffer. A write address of the storage locations in the buffer may change with each symbol. Accordingly, data associated with each symbol in a slot may be stored in a unique location in the buffer as indicated by the write addresses. The timing of the write addresses may be illustrated by the write address 317. Similarly, the data associated with the symbol clock 325 may be stored in locations in the buffer as indicated by the write address 327.

The slot clock 310 and the symbol clock 315 may be communicated as part of the timing signals T from the CPP 208, for example, with respect to the signals received from the transmit antenna 201a. Similarly, the slot clock 320 and the symbol clock 325 may be communicated as part of the timing signal T' from the CPP 212 with respect to the signals received from the transmit antenna 201b. The offset of the slot clock 320 at time instant 321 with respect to the slot clock 310 at time instant 311 may indicate additional propagation delay of the signals from the transmit antenna 201b with respect to the signals from the transmit antenna 201a. Since the same data may be transmitted by the transmit antennas 201a and 201b, the symbols at time instants 312, 313, . . . , 314 may correspond to the respective symbols at time instants 322, 323, . . . , 324.

After an appropriate delay to allow symbols from both CPPs 208 and 212 to be stored, the data associated with the slot clocks 310 and 320 may be read and combined. This delay may be a read delay. The read delay may comply with the WCDMA standard that allows a delay of ±148 chips. The slot clock 330 may illustrate the start of a read slot, and the slot clock 330 may be delayed with respect to the slot clock 310. The symbol clock 335 may be similarly delayed with respect to the symbol clock 315. The read address 337 may be generated based on the slot clock 330 and the symbol clock 335. The data that is read based on the read addresses 337 may be the data that was stored with the write addresses 317 and 327. The data may be read and output as $S_n$. The timing signal T", which may comprise the symbol clock and the slot clock, may be output as reference signals by which to extract the symbols $S_n$ at appropriate times.

An embodiment of the invention may time-track streams of symbols in a plurality of clusters and combine them into a single stream. The buffer size may be dependent on the read delay. An embodiment of the invention may define the buffer size as follows:

$$M' = 2 \times \text{Max-allowed-delay/minimal-symbol-duration},$$

$$N = 2560/\text{minimal-symbol-duration}$$

where the buffer size M may be the smallest number divisible into N that is greater or equal to M'. For example, with a symbol duration of 4 chips, the number of symbols in a slot is N=2560/4=640 and M'=148×2/4=74. Therefore, the buffer size M may be M=80. Since M=80 divides into N, it may ensure that a symbol n=(k×M)+p may be able to be written to address p. It therefore facilitates a simple addressing scheme based on a modulo M counter, where the counter may be reset to zero at the slot boundaries. That is, for n=0, $s_n$ may be written to location zero.

Figure 4:
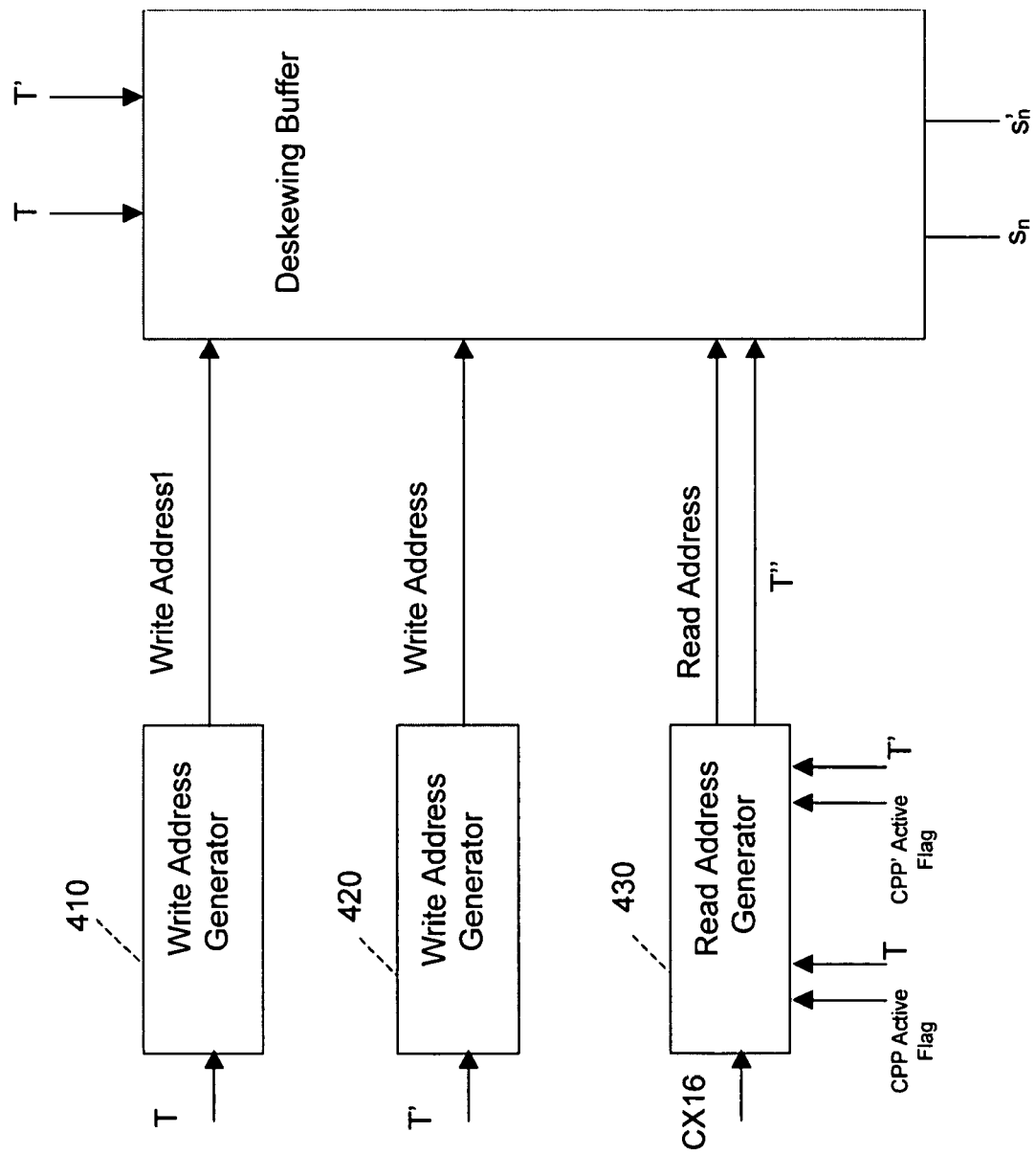
FIG. 4 is an exemplary block diagram illustrating exemplary macro combiner, in accordance with an embodiment of the invention.

FIG. 4 is an exemplary block diagram illustrating exemplary macro combiner, in accordance with an embodiment of the invention. Referring to FIG. 4, there is shown write address generators 410 and 420, a read address generator 430, and a de-skewing buffer 440. The write address generators 410 and 420 may comprise circuitry, logic and/or code that may be adapted to receive the timing signal, for example, T and/or T', and generate an address to write data, for example, $S_n$ and/or $S_n'$.

An embodiment of the write address generator 410 may be a modulo M counter where M may be the number of symbols that may be stored in the de-skewing buffer 440. The counter may be cleared by the slot clock, for example, the slot clock 310 (FIG. 3), and, therefore, the write address may be zero at the start of every slot. The write address, for example, the write address 317 (FIG. 3), may be incremented by the symbol clock, for example, the symbol clock 315 (FIG. 3).

Similarly, the write address generator 420 may receive the timing signal T' generated by the CPP 212. An implementation of the write address generator 420 may be a modulo M counter where M may be the number of symbols that can be stored in the de-skewing buffer 440. The counter may be cleared by the slot clock, for example, the slot clock 320 (FIG. 3), and, therefore, the write address may be zero at the start of every slot. The write address, for example, the write address 327 (FIG. 3), may be incremented by the symbol clock, for example, the symbol clock 325 (FIG. 3).

The read address generator 430 may generate the timing signal T" that may facilitate physical layer processing, for example, interleaving, rate matching, and decoding. These processing may be performed on the stream of symbol that are combined, stored and read from the de-skewing buffer. T" may be considered as the reference clock for all processing that may be performed on the symbol streams. As such it may be based on a clock known in the art as CTX0 that may be highly stable. CTX0 may be, for example, a stable, temperature and/or voltage compensated crystal oscillator clock. Therefore, the present invention may provide a stable reference clock, for example, T", that may be immune to time fluctuation that T and T' may have. Since T and/or T' may be referenced to received clusters of signals, they may be terminated and revived at different temporal locations as clusters fade out or new clusters are received. Therefore, it may be advantageous to synthesize the clock T" independently of T and T'. The other clocks generated, for example, T and T', as references for received clusters of signals may provide time correction stimulus that may generate a time error. This may be described with respect to FIG. 5. The correction rate of the time error may also be governed by higher layers (not shown) in the mobile terminal.

The slot clock and the symbol clock in the timing signal T" may be a delayed version of the slot clock and the symbol clock in the timing signals T and/or T'. This may be necessary since the data associated with the timing signals T and T' may need to be stored in the de-skewing buffer 440 before those data may be read with respect to the slot clock and the symbol clock in the timing signal T". The read address generator 430 may use a clock (C×16) that is 16 times the chip rate. Therefore, the granularity of delay of the timing signal T" may be in increments of $1/16^{th}$ of the chip rate.

Reading from the de-skewing buffer 440 may have a greater priority than writing to the de-skewing buffer 440. For example, if the read event 335 (FIG. 3) coincides with one of the write event 315 (FIG. 3), that is, if the two clocks coincide, the reading may be performed first, and the writing to the addresses generated by the write address generators 410 and 420 may be temporary stored. The temporary storage location may be a part of the de-skewing buffer 440. The writing may be completed after the reading from the de-skewing buffer 440 is accomplished. If there is no concurrent read operation, then the writing of data corresponding to the timing signals T and T' may be performed in a defined order. For example, the symbol $s_n'$ corresponding to the timing signal T' may be temporarily stored while the symbol $s_n$ corresponding to the timing signal T may be written first into the de-skewing buffer 440. The symbol $s_n'$ may then be written into the de-skewing buffer 440. Alternatively, the data corresponding to the timing signal T' may have priority for writing.

An embodiment of the invention may allow clearing of a location in the de-skewing buffer 440 upon reading its value. Writing data to an address at the de-skewing buffer 440 may be similar to a read-modify-write operation. When writing a value to the de-skewing buffer 440, the value at that address may be read, combined with the current value, and the resulting value may be written to the that address. The result may be that the first symbol received, for example, $s_n$, may be written to its address (n modulo(M)), and the corresponding symbol received later, for example, $s_n'$, may be combined.

Although there may only be two write address generators illustrated with respect to FIG. 4, the invention need not be so limited. For example, an implementation of the invention may allow a plurality of address generators that may generate write addresses for the de-skewing buffer. A plurality of symbol streams corresponding to timing signals from a plurality of the CPPs may be written to an address location in the de-skewing buffer 440. Accordingly, the combined value from a plurality of clusters may be accumulated until the address location is read and the address location is cleared of data.

Figure 5:
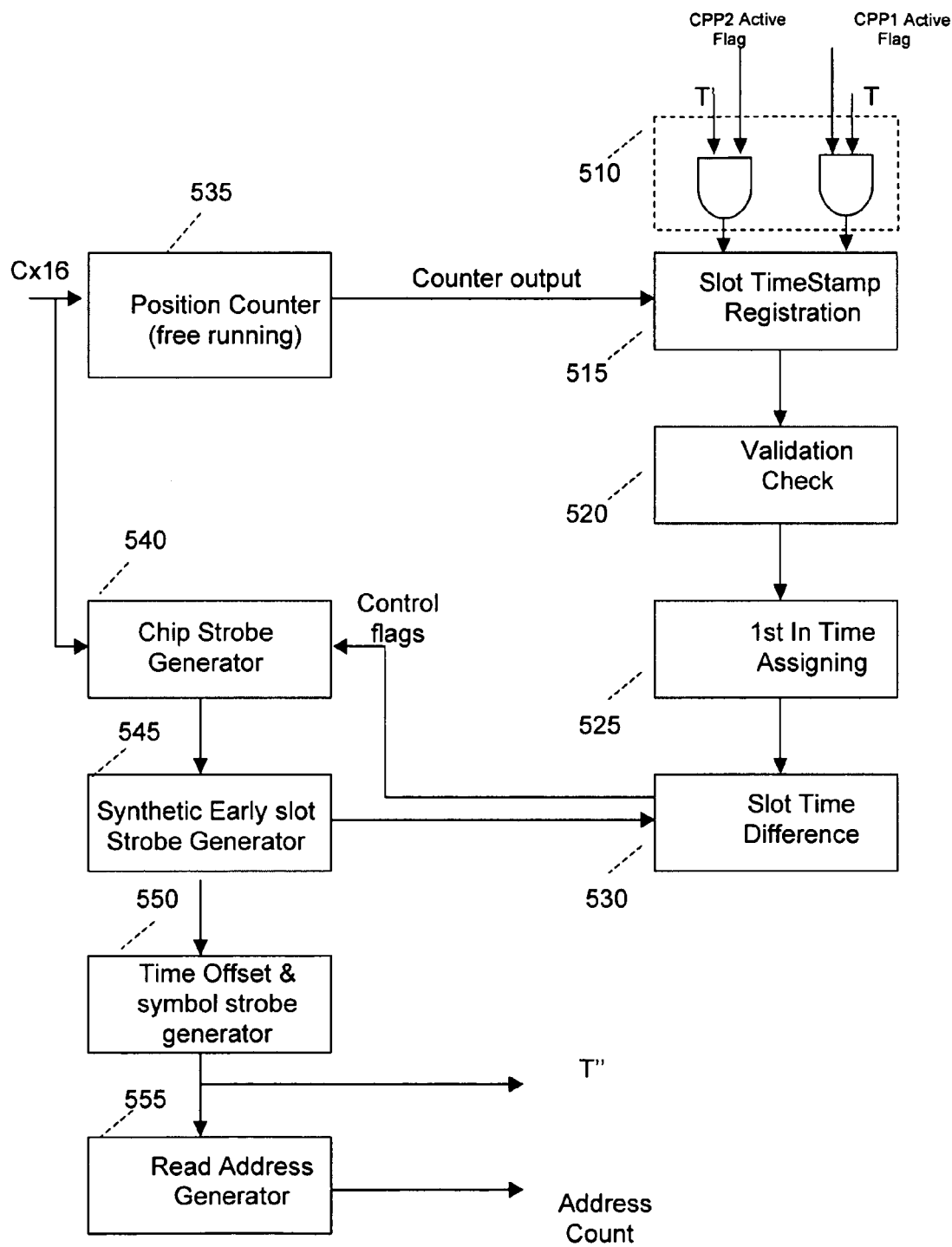
FIG. 5 is an exemplary flow diagram illustrating the read address generator of FIG. 4, in accordance with an embodiment of the invention.

FIG. 5 is an exemplary flow diagram illustrating the read address generator of FIG. 4, in accordance with an embodiment of the invention. Referring to FIG. 5, in block 510, the CPP active flags from the CPPs 208 and 212, which may indicate when received signals are above a valid threshold, may be used to effectively gate the timing signals T and T', as well as the input signals $s_n$ and $s'_n$. The CPP active flags may also be referred to as locked signals. Accordingly, the symbols that are above a certain threshold signal level may be combined. Alternatively, only the input signals $s_n$ and $s'_n$ may be gated, or only the timing signals T and T' may be gated, or no signals may be gated.

In block 515, the slot clocks of the timing signals T and T' that indicate the start of slots may be time-stamped with time-stamps generated by the position counter in block 535. The position counter in block 535 may comprise, for example, a free running counter that may be clocked by the clock C×16 that may have a frequency of 16 times the chip rate. The counter may be such that all M counts are mapped uniquely. For example, with M=80, the maximum count may be 128×4×16−1. Therefore, is the counter may be a 13-bit counter. The time stamp, therefore, may have a resolution of $1/16^{th}$ of a chip time. In block 520, the time-stamps may be checked to verify that the absolute difference of the time-stamps for the slot start times of the slot clocks in the timing signals T and T' may not be greater than a threshold value. The threshold value may be part of the WCDMA standard. If the slot start time for a slot in the timing signal T' is greater than the threshold value, the data corresponding to that slot may not be combined with the data in the reference signal. In block 525, the timing signal with the time stamp that corresponds to the earliest arrival time may be designated as a reference signal. This reference signal may generally have the shortest propagation path from the transmitting antenna to the receiving antenna, and therefore may be the strongest signal.

Block 530 may compare the time difference between the received reference slot clock and the synthetic early slot clock generated in block 545. The synthetic early slot clock may be used to generate the read slot clock and read symbol clock. The synthetic early slot, the read slot clock, and the read symbol clock may be generated by clock division of the clock C×16 in FIG. 4. Such a clock may have inherent CTX0 stability. However, these synthetic clocks may be meaningful if they track the write strobes, in some manner, that will become clear from the following text. An embodiment of the invention may combine desired features of having stability and temporal tracking of the output combined stream of symbols. The temporal location of T and T', relative to the synthetic early clock, may be used to generate a time-error signal that may affect the synthetic clock time-location.

Application of the time correction may be governed by several considerations, for example, accuracy, stability, reliability and consistency of the combined signal stream. The invention represents an exemplary method, in the text below for controlling the synthetic clocks temporal location. One who skilled in the art may extend this method to reflect the above considerations. Some of theses requirements may be due to WCDMA standard. Since the synthetic early clocks may represent the timing reference of the combined clusters, it may be regarded as time reference for the mobile terminal.

In an exemplary embodiment of the invention, the time difference may be indicated by three flags that may be generated and used as control signal input to block 540. A first flag may indicate that the reference signal slot is ahead of the synthetic early slot. A second flag may indicate that the reference signal slot is lagging behind the synthetic early slot. A third flag may indicate that the reference signal slot is synchronized with the synthetic early slot. The chip strobe generator in block 540 may receive the clock signal C×16 and the control signal from block 530. The control signal from block 530 may be used to adjust the period of the chip strobes that may be communicated to the synthetic early slot generator in block 545. Accordingly, the synthetic early slot may be effectively moved in time until it may be aligned in time to the received reference signal slot.

In block 550, a time offset may be introduced, and the synthetic early slot strobe may be delayed to become a read slot strobe. The read strobe may generate a read symbol strobe. In block 555, the read addresses may be generated based on the read strobe and the read slot strobe. The read strobe and the read slot strobe may constitute the T" timing signal.

Accordingly, the delayed synthetic early slot clock generated in block 550 may have a delay with respect to the first write to the buffer, for example, the de-skewing buffer 440 (FIG. 4), whether the symbol originated from the CPP 208 or the CPP 212. The delay generated in block 550 may delay the read symbol clock, for example, the read symbol clock 335 (FIG. 3) by ½ the size of the buffer with respect to the reference symbol clock, for example, the symbol clock 315. For example, if a de-skewing buffer holds 80 symbols, the reading clock may be delayed by 40 symbol-times from the reference symbol clock.

Another embodiment of the invention may provide a machine-readable storage, having stored thereon, a computer program having at least one code section executable by a machine, thereby causing the machine to perform the steps as described above for processing multipath clusters.

Aspects of the system may comprise a CPP, for example, the CPP 208 or 212 (FIG. 2) that tracks a plurality of received clusters of signals. A single CPP may be assigned to process a single cluster of signals. The plurality of received clusters of signals may be transmitted via at least one antenna per base station. The CPP may generate a RF channel estimate for at least a portion of each of the plurality of received clusters of signals, where a single cluster of the plurality of received clusters of signals may comprise an aggregate of received signal paths. A timing signal may be generated by the CPP to reference the RF channel estimate.

There may be circuitry that processes the RF channel estimate with at least a portion of each of the plurality of received clusters of signals, where the plurality of received clusters of signals may have in-phase and quadrature components. For example, a MRC 216 or 214 (FIG. 2) may generate convolved signals by convolving the RF channel estimate with at least a portion of each of the plurality of received clusters of signals. A despreader, for example, the despreader 220 or 222 (FIG. 2), may despread the convolved signals to generate despread signals. A macro combiner, for example, the macro combiner 218 (FIG. 2) may combine a plurality of despread signals to generate combined signals. A timing signal may be generated by the macro combiner 218 (FIG. 2) to reference the combined signals.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing received signals, comprising:
   receiving a plurality of signal clusters, each of said plurality of signal clusters comprising a plurality of individual distinct path signals;
   concurrently generating a corresponding symbol for each of said received plurality of signal clusters;
   comparing each of said concurrently generated corresponding symbols to a threshold signal value; and
   combining said plurality of concurrently generated corresponding symbols based on said comparing of said each of said concurrently generated corresponding symbols to said threshold signal value.

2. The method according to claim 1, further comprising:
   generating a corresponding timing signal for said each of said received plurality of signal clusters.

3. The method according to claim 2, wherein said step of generating said corresponding timing signal comprises:
   generating said corresponding time stamp for each of said generated corresponding timing signals based on said comparing of said each of said concurrently generated corresponding symbols to said threshold signal value.

4. The method according to claim 3, further comprising:
   determining a reference symbol among said plurality of concurrently generated corresponding symbols based on said generated corresponding time stamps.

5. The method according to claim 4, further comprising:
   determining a reference timing signal which corresponds to said determined reference symbol based upon said corresponding timing signal.

6. The method according to claim 5, further comprising:
   determining a reference time stamp which corresponds to said reference timing signal based upon said generated corresponding time stamp.

7. The method according to claim 6, further comprising:
   computing a difference between each of said plurality of corresponding time stamps and said reference time stamp.

8. The method according to claim 7, further comprising:
   comparing each of said computed differences to a threshold timing value.

9. The method according to claim 8, further comprising:
   combining said plurality of concurrently generated corresponding symbols based on said comparing of each of said computed differences to said threshold timing value.

10. The method according to claim 9,
    wherein for each of said plurality of concurrently generated corresponding symbols, said step of combining said plurality of concurrently generated corresponding symbols comprises:
    reading a current value from a buffer at a specified location;
    generating a modified value based on said read current value and a current one of said plurality of concurrently generated corresponding symbols; and
    writing said modified value to said buffer at said specified location.

11. The method according to claim 10, further comprising:
    determining said specified location based on a generated write address.

12. The method according to claim 11, further comprising:
    generating said write address based on said generated corresponding timing signal, which corresponds to said current one of said plurality of concurrently generated corresponding symbols.

13. The method according to claim 3, further comprising;
    comparing said reference timing signal and a generated slot clock signal.

14. The method according to claim 13, further comprising:
    generating one or more control signals based on said comparing of said reference timing signal and said generated slot clock signal.

15. The method according to claim 14, further comprising:
    adjusting said generated slot clock signal based on said generated one or more control signals.

16. The method according to claim 15, further comprising:
    generating a read strobe signal based on said adjusted generated slot clock signal a generated time offset.

17. The method according to claim 16, further comprising:
    generating a read address based on said generated read strobe signal.

18. The method according to claim 17, further comprising:
    outputting a result of said combining of said plurality of concurrently generated corresponding symbols from a buffer based on said generated read address.

19. A system for processing received signals, comprising:
    a cluster path processor configured to:
    receive a plurality of signal clusters each of said plurality of signal clusters comprising a plurality of individual distinct path signals,
    to concurrently generate a corresponding symbol for each of said received plurality of signal clusters,
    to compare each of said concurrently generated corresponding symbols to a threshold signal value, and
    to combine said plurality of concurrently generated corresponding symbols based on said comparing of said each of said concurrently generated corresponding symbols to said threshold signal value.

20. The system according to claim 19, wherein said cluster path processor is further configured to generate a corresponding timing signal for said each of said received plurality of signal clusters.

21. The system according to claim 20, wherein said cluster path processor is configured to generate a corresponding time stamp for each of said generated corresponding timing signals based on said comparing of said each of said concurrently generated corresponding symbols to said threshold signal value to generate said corresponding timing signal for said each of said received plurality of signal clusters.

22. The system according to claim 21, wherein said cluster path processor is further configured to determine a reference symbol among said plurality of concurrently generated corresponding symbols based on said generated corresponding time stamps.

23. The system according to claim 22, wherein a reference timing signal is said generated corresponding timing signal, which corresponds to said determined reference symbol.

24. The system according to claim 23, wherein a reference time stamp is said generated corresponding time stamp, which corresponds to said reference timing signal.

25. The system according to claim 24, wherein said cluster path processor is further configured to compute a difference between each of said plurality of generated corresponding time stamps and said reference time stamp.

26. The system according to claim 25, wherein said cluster path processor is further configured to compare each of said computed differences to a threshold timing value.

27. The system according to claim 26, wherein said cluster path processor is further configured to combine said plurality of concurrently generated corresponding symbols based on said comparing of each of said computed difference(s) differences to said threshold timing value.

28. The system according to claim 27, wherein said cluster path processor is configured to perform said combining by, for each of said plurality of concurrently generated corresponding symbols:
  reading a current value from a buffer at a specified location;
  generating a modified value based on said read current value and a current one of said plurality of concurrently generated corresponding symbols; and
  writing said modified value to said buffer at said specified location.

29. The system according to claim 28, wherein said cluster path processor is further configured to determine said specified location based on a generated write address.

30. The system according to claim 29, wherein said cluster path processor is further configured to generate said write address based on said generated corresponding timing signal, which corresponds to said current one of said plurality of concurrently generated corresponding symbols.

31. The system according to claim 21, wherein said cluster path processor is further configured to compare said reference timing signal and a generated slot clock signal.

32. The system according to claim 31, wherein said cluster path processor is further configured to generate one or more control signals based on said comparing of said reference timing signal and said generated slot clock signal.

33. The system according to claim 32, wherein said cluster path processor is further configured to adjust said generated slot clock signal based on said generated one or more control signals.

34. The system according to claim 33, wherein said cluster path processor is further configured to generate a read strobe signal based on said adjusted generated slot clock signal a generated time offset.

35. The system according to claim 34, wherein said cluster path processor is further configured to generate a read address based on said generated read strobe signal.

36. The system according to claim 35, wherein said cluster path processor is further configured to output a result of said combining of said plurality of concurrently generated corresponding symbols from a buffer based on said generated read address.

* * * * *

UNITED STATES PATENT AND TRADEMARK OFFICE
CERTIFICATE OF CORRECTION

PATENT NO. : 8,406,251 B2
APPLICATION NO. : 11/173870
DATED : March 26, 2013
INVENTOR(S) : Kent et al.

It is certified that error appears in the above-identified patent and that said Letters Patent is hereby corrected as shown below:

In the Claims:

Column 16, Line 21, "comprising;" should read --comprising:--

Column 16, Line 34, "signal a generated" should read --signal and a generated--

Column 17, Lines 21-22, "difference(s) differences" should read --differences--

Column 18, Line 22, "signal a" should read --signal and a--

Signed and Sealed this
Eighteenth Day of June, 2013

Teresa Stanek Rea
*Acting Director of the United States Patent and Trademark Office*